Aug. 16, 1932.   D. R. YARNALL   1,872,211
GREASER VALVE FOR ALEMITE FITTING CONNECTIONS
Filed June 5, 1931

Inventor:
David Robert Yarnall

Patented Aug. 16, 1932

1,872,211

UNITED STATES PATENT OFFICE

DAVID ROBERT YARNALL, OF PHILADELPHIA, PENNSYLVANIA, ASSIGNOR TO YARNALL-WARING COMPANY, OF PHILADELPHIA, PENNSYLVANIA, A CORPORATION OF PENNSYLVANIA

GREASER VALVE FOR ALEMITE FITTING CONNECTIONS

Application filed June 5, 1931. Serial No. 542,254.

My invention relates to a method of lubricating the friction members of a seatless valve.

A purpose of the invention is to feed lubricant upon the outside of the tubular plunger of a seatless valve intermediate longitudinally spaced packing rings thereof, so that reciprocation of the plunger incident to opening and closing of the valve may carry lubricant to the packings.

A further purpose is to utilize structure limiting the longitudinal movement of a seatless valve in the dispensing of lubricant upon the friction members of the valve.

A further purpose is to apply the alemite method of lubrication to the friction members of seatless valves.

A further purpose is to utilize structure which now prevents rotation of a pushing gland within a seatless valve for the additional purpose of lubricating the valve plug.

Further purposes will appear in the specification and in the claims.

I have elected to show one main form only of my invention, showing however a minor modification and selecting a main form and modification thereof that are practical and efficient in operation and which well illustrate the principles involved.

Like numerals refer to like parts in both figures.

Figure 2:
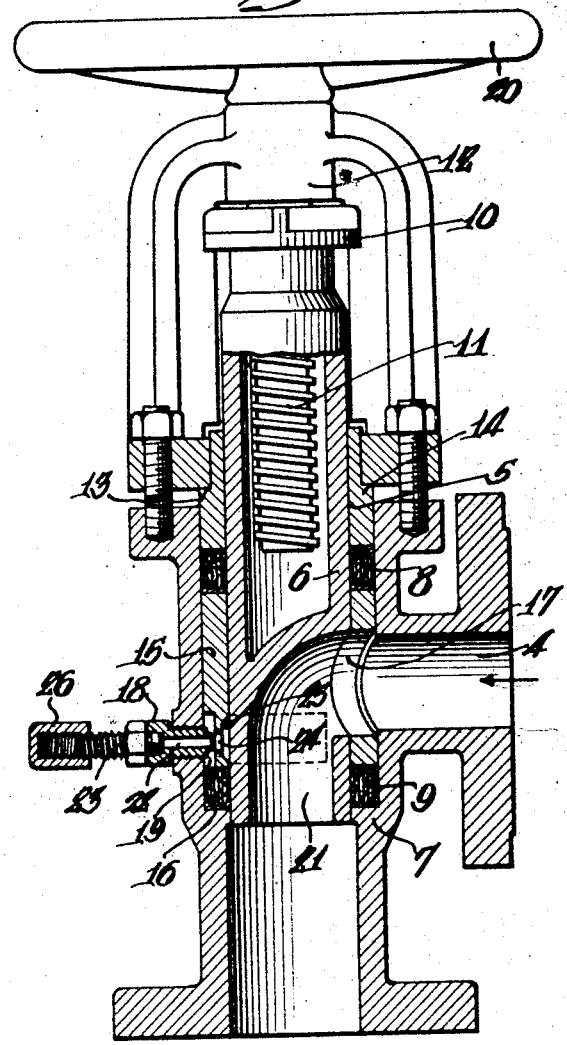
Figure 2 is a view corresponding to Figure 1 except that the valve is shown open in Figure 2 and closed in Figure 1.

Describing in illustration and not in limitation and referring to the drawing:—

The illustration shows my invention embodied upon a commercial valve of the seatless hollow piston type such as is used frequently in a blow-off line of a boiler.

A lateral inlet 4, usually connected to a high pressure boiler or the like, is normally closed by a cylindrical surface 5 of the valve piston 6, the piston being externally sealed with respect to the valve body 7 by upper and lower packing rings 8 and 9 respectively above and below the inlet port 4.

The piston has a flanged head 10 internally threaded for receiving the operating screw 11, the screw journalling in the bonnet 12 and the bonnet seating on an upwardly directed shoulder 13 of an upper gland 14 fitting between the body and plunger.

The bonnet is bolted to the body but spaced therefrom by engaging the upper end of the gland 14, pressing the gland downward upon the packing 8 which in turn presses a lower gland 15 downward upon the lower packing 9, the lower packing seating on a shoulder 16 of the body.

The lower gland is ported at 17 in registry with the inlet port 4. In existing valves of this type any angular movement of the gland is prevented by a set screw in the position of screw 18, carried by the body and having an inner end projecting into a short longitudinal slot 19 of the gland. As a matter of convenience I can use this same position for a set screw serving this purpose but make it hollow as is true of 18 and use it as a feeder for lubricant, or can inject the lubricant through a wholly separate inlet such as 18 which does not perform the additional function. I prefer, and therefore illustrate the structure which performs the double function.

It will be seen that the slideway of the plunger includes the gland 14, packing ring 8, gland 15 and packing ring 9, the whole pull of the bonnet bolts being transmitted to compress the packing rings. The operator is able also to increase the compression of the packings and the tightness of seal during valve closure by additionally turning the valve wheel 20 after the flanged head 10 of the plunger engages the upper end of the gland 14.

The port 21 through the plunger has a lateral inlet adapted to register with the ports 17 and 4 when the valve is open as in Figure 2, and a longitudinal outlet from the lower end of the plunger.

The structure thus far described, using a solid screw instead of the screw shown at 18 is old and has been used commercially for years.

Figure 1:
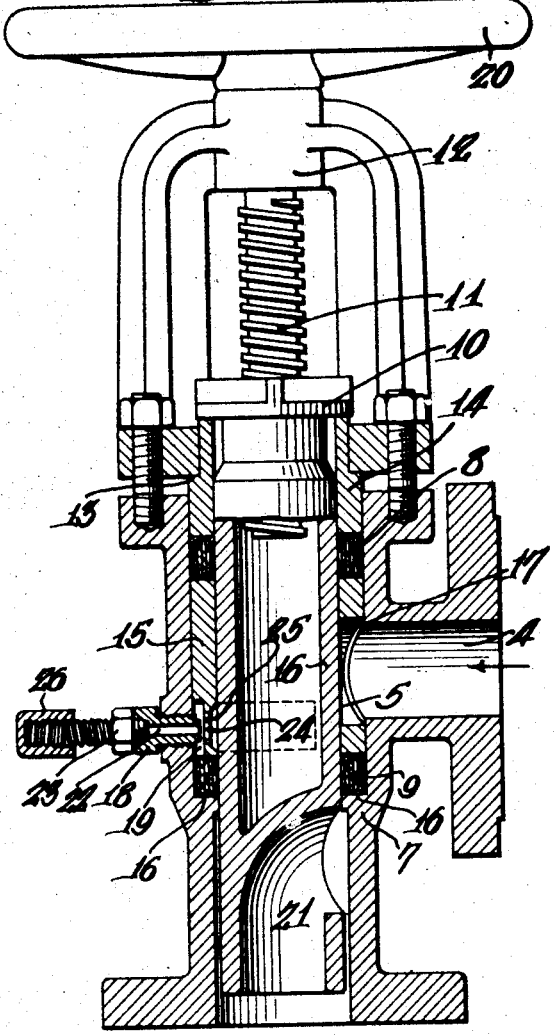
Figure 1 is a fragmentary longitudinal section through a seatless blow-off valve shown closed and equipped with lubricating structure embodying a desirable form of my invention.

I use the position of the stop screw or a separate location, as preferred, for an inlet for dispensing lubricant to the friction members of the valve. The inlet 18 is hollow at 22 so as to pass lubricant and adapted at its outer end to receive a delivery fitting 23. In Figures 1 and 2 it is threaded.

The inlet communicates with the interior of the valve bore in order that it may lubricate the surface 5 of the plunger or piston 6. Where the screw 18 performs both functions this is conveniently done as shown. The lower gland member 15 is bored at 24 from the slot 19 and is preferably circumferentially grooved on its inside surface at 25 in registry with the bore 24, the groove extending wholly or partially around the interior of the lower gland member as preferred.

Each delivery of lubricant passes through the fittings 23 and 18, slot 19, and the perforation 24 into the groove 25 to engage the outside of the plunger throughout the length of the groove, the plunger carrying the lubricant upwardly and downwardly to the packing rings.

It is obvious the actual method of delivering lubricant to the fitting 18 and the character of this inlet may be widely varied, both being given forms to best accommodate the lubricant fed.

In Figures 1 and 2 the fitting 23 has an outer end adjustably threading into the open end of a grease cup 26. The operator of the valve screws the cup further upon the fitting 23 preparatory to opening and closing the valve whenever lubrication of the valve appears desirable.

Figure 3:
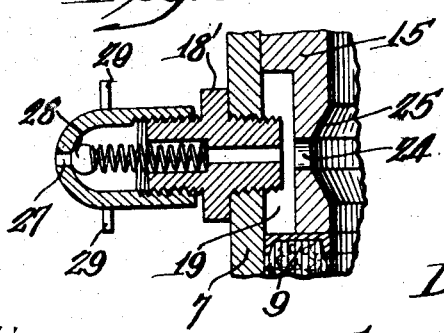
Figure 3 is a fragment of Figure 1 or Figure 2 modified with respect to the mechanism for delivering lubricant to the valve plunger.

In the structure of Figure 3 the perforated stop fitting 18' has its capped outer end 27 normally closed by a spring pressed ball 28, the fitting carrying lateral pins 29, to be engaged by the hooks of an alemite type of lubricant pump to be used successively upon any number of valves, each presenting a lubricant fitting, such for example as that shown in Figure 3.

The form of Figure 3 is particularly advantageous when there are a great many valves under the general care of an engineer normally not an operator of the valves.

In view of my invention and disclosure variations and modifications to meet individual whim or particular need will doubtless become evident to others skilled in the art, to obtain all or part of the benefits of my invention without copying the structure shown, and I, therefore, claim all such in so far as they fall within the reasonable spirit and scope of my invention.

Having thus described my invention, what I claim as new and desire to secure by Letters Patent is:—

1. A seatless valve including a plunger having a through L passage from side to end of the plunger, longitudinally spaced annular packing rings about the plunger and an intermediate inner gland laterally ported in registry with a lateral port of the body and grooved about its interior and formed with a lubricant passage from the outside of valve to said groove.

2. A seatless valve including a plunger having a through L passage from side to end of the plunger, longitudinally spaced annular packing rings about the plunger and an intermediate inner gland laterally ported in registry with a lateral port of the body, grooved about its interior and formed with a lubricant passage from the outside of valve to said groove and external means for forcing a lubricant into said passage.

3. A seatless valve including a plunger having a through L passage from side to end of the plunger, longitudinally spaced annular packing rings about the plunger and an intermediate inner gland laterally ported in registry with a lateral port of the body and grooved about its interior, and a hollow stop engaging the intermediate gland to prevent its rotation, the interior of the stop being in communication with the groove and the exterior accessible for insertion of lubricant.

4. A seatless valve including a plunger having a through L passage from side to end of the plunger, longitudinally spaced annular packing rings about the plunger and an intermediate inner gland laterally ported in registry with a lateral port of the body, and a lubricant head mounted on the body having an inner shank laterally fitting an exterior longitudinal recess of the intermediate gland to angularly lock the said gland with respect to the body and permit longitudinal movement thereof for variant compression of the packing, and being accessible from the outside.

5. A seatless valve including a plunger having a through L passage from side to end of the plunger, longitudinally spaced annular packing rings about the plunger and an intermediate inner gland laterally ported in registry with a lateral port of the body, and a lubricant head of the alemite type mounted on the body having an inner shank laterally fitting an exterior longitudinal recess of the intermediate gland to angularly lock the said gland with respect to the body and permit longitudinal movement thereof for variant compression of the packing, and being accessible from the outside for engagement of an alemite type gun.

6. A seatless valve including a tubular plunger having a lateral port, longitudinally spaced packing rings around an intermediate portion of the plunger, a laterally ported sleeve between the rings, a T body casing receiving the packing rings and sleeve, and a gland adapted by inward movement to compress the packing rings and sleeve in combination with a stop fitting for angularly registering the lateral ports of the sleeve and body and means for passing lubricant through the fitting and sleeve to the plunger.

7. In a seatless valve, a T body having a lateral opening, upper and lower glands, an upper packing ring between the glands, a lower packing, an annular shoulder of the body seating and upwardly supporting the lower packing, the lower gland having a lateral opening registering with that of the body, a plunger having a slideway including the glands and packing rings and having an L passage with a side port adapted to register with the port through the lower gland, and a longitudinally perforated stop fitting preventing angular movement of the lower gland, while permitting its longitudinal movement, and the lower gland having an interior recess and a port for delivering lubricant from the inner end of the stop fitting to the outside of the plunger around a considerable portion of the circumference thereof.

DAVID ROBERT YARNALL.